United States Patent Office 3,741,894
Patented June 26, 1973

3,741,894
CHEMICALLY MODIFIED ORGANIC POLYMERS
Stanley J. Storfer, Elizabeth, N.J., assignor to
Esso Production Research Company
Original application June 15, 1967, Ser. No. 646,246, now Patent No. 3,555,006. Divided and this application June 8, 1970, Ser. No. 51,412
Int. Cl. C10m 3/48; B01j 13/00
U.S. Cl. 252—8.5 C   7 Claims

ABSTRACT OF THE DISCLOSURE

Long chain water-soluble organic polymers having hydroxyl groups located at $\beta$ positions with respect to one another are reacted with $\alpha$-keto carboxylic acids under aqueous conditions to form modified polymers useful in the preparation of oilfield drilling fluids and similar compositions.

CROSS-REFERENCE TO RELATED APPLICATION

This application is a division of Ser. No. 646,246, "Chemically Modified Organic Polymers," filed for Stanley J. Storfer on June 15, 1967, now Pat. No. 3,555,006.

BACKGROUND OF THE INVENTION

(1) Field of the invention

This invention relates to the chemical modification of long chain water-dispersible organic polymers and is directed particularly to the reaction of $\alpha$-keto carboxylic acids with long chain water-dispersible polysaccharides and similar organic polymers containing hydroxyl groups located at $\beta$ positions with respect to one another to form modified polymers that can be crosslinked with chromium and other polyvalent cations in aqueous solution and employed for the drilling, completion and workover of oil wells, gas wells and similar boreholes.

(2) Description of the prior art

Conventional oilfield drilling muds and related compositions generally contain bentonites or similar clays in substantial quantities. These clays provide the viscosity and gel strength required for the suspension of cuttings and weighting agents and assist in formation of the filter cake needed for the reduction of fluid losses to surrounding subsurface strata. It has been found that excessive viscosity has an adverse effect on the drilling rates and that better results can often be obtained by using fluids containing organic water-soluble polymers that are more shear sensitive than the conventional fluids. Aqueous fluids containing polymers crosslinked with trivalent chromium or similar polyvalent cations are particularly effective. The number of polymers that are susceptible of such crosslinking and that possess the stability and other characteristics required is limited.

SUMMARY OF THE INVENTION

It has now been found that certain long chain water-soluble or water-dispersible organic polymers that are not normally susceptible of crosslinking with trivalent chromium and similar polyvalent cations can be chemically modified to permit such crosslinking. Studies have shown that water-dispersible organic polymers having hydroxyl groups located in $\beta$ positions with respect to one another can be reacted in aqueous solution with $\alpha$-keto carboxylic acids containing from about 2 to about 6 carbon atoms per molecule to form cyclic ketals. The reaction products possess the essential characteristics of the unmodified polymers but undergo crosslinking reactions with trivalent chromium and other polyvalent cations in aqueous solution, apparently through an olation mechanism. The crosslinked reaction products are considerably more effective as viscosity builders than are the unmodified polymers.

BRIEF DESCRIPTION OF THE DRAWING

The drawing illustrates typical materials that may be employed in practicing the invention.

DESCRIPTION OF THE PREFERRED EMBODIMENTS

A variety of different polyglucans, galacto-mannans and other long chain water-dispersible organic polymers having hydroxyl groups located in $\beta$ positions with respect to one another may be used in carrying out the invention. Guar gum and similar branched chain polysaccharides having hydroxyl groups and hydroxymethyl groups attached to adjacent carbon atoms on pendant rings extending from the main chain or backbone of the polymer molecule are generally less susceptible to steric hindrance and are therefore more effective than unbranched polymers. Such polysaccharides can be obtained from the seeds of the guar plant, the locust bean, the Kentucky coffee bean and other plants, from the exudates produced by certain molds, fungi and other microorganisms, and from other sources.

Figure 1:
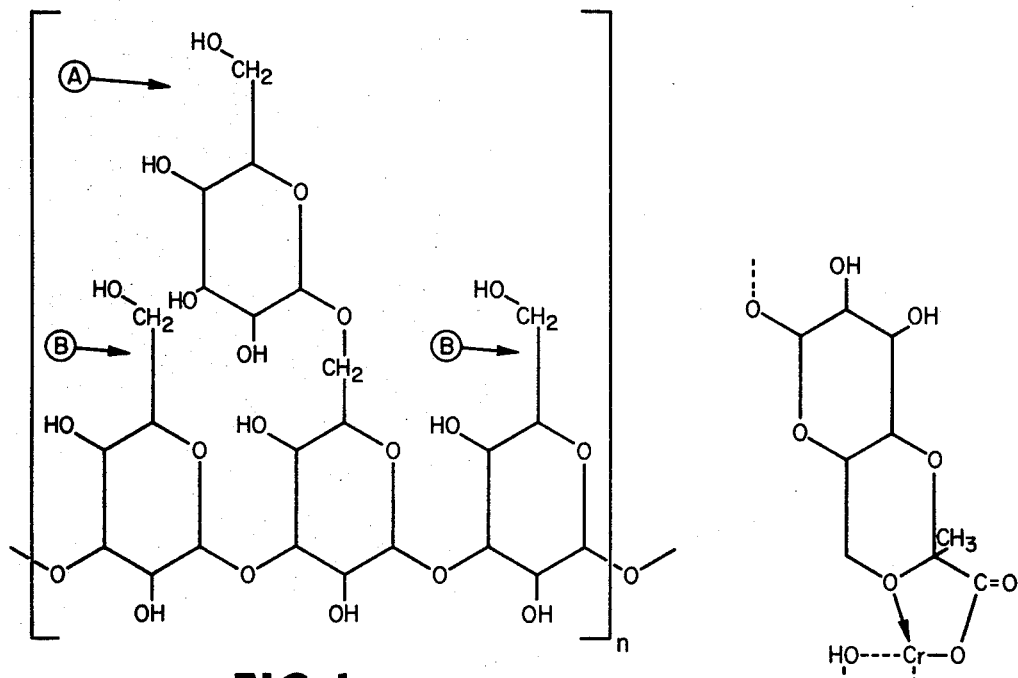
FIG. 1 sets forth the structural formula of a long chain water soluble organic polymer useful as a starting material in preparing the modified polymers.

FIG. 1 in the drawing illustrates a particularly effective polymer for purposes of the invention. The material shown is a nonionic polysaccharide having a $\beta$-1,3 glucan main chain or backbone with pendant glucose rings attached to every third glucose unit along the chain. Hydroxyl groups and hydroxymethyl groups are attached to adjacent carbon atoms at point A on each pendant ring and at points $\beta$ on the main chain or backbone of the polymer molecule. This polysaccharide is produced by the fermentation of carbohydrates with certain molds under controlled fermentation conditions. Organisms which can be employed include Sclerotium Glucanicum, Sclerotium Delphinii, Sclerotium Rolfsii, Sclerotium Coffeelcolum, Sclerotinia Gladoli, Corticium Rolfsii, and Stromatinia Narcissi. These organism possess the ability to synthesize the polysaccharide from sucrose, D-xylose, D-mannose, D-glucose, L-arabinose, D-galactose, D-fructose, maltose, melezitoac, raffinose, methylbeta-maltoside, aesculin, cellobiose, trehalose, L-rhamnose, glycerol, cellulose, xylan and mixtures of these and other carbohydrates. A variety of crude waste materials may be employed as carbohydrate sources if desired. All of the organisms and carbohydrate sources are not equally effective.

The fermentation process for production of the polysaccharide of FIG. 1 is generally carried out by first preparing a culture medium containing from about 3 to about 15 percent by weight of the selected carbohydrate, a small amount of yeast extract or other suitable organic nitrogenous material, and mineral salts conventionally employed in fermentation broths. This medium, which preferably has a pH of from about 3.5 to 5.5, is inoculated with the organism to be employed and incubated at a temperature between about 70° F. and about 90° F. for a period of from about 2 to 6 days. Aeration is generally supplied to obtain optimum growth of the organism and maximum polysaccharide production. At the end of the growth period, the resulting liquor may contain from about 600 to 900 milligrams of the polysaccharide per 100 milliliters of culture medium. The mycelium can be separated from the medium by diluting the liquor with sufficient water to reduce the viscosity appreciably and then filtering or centrifuging it. Thereafter, the polysaccharide can be precipitated from the mycelium-free liquor by adding methanol, ethanol, acetone or a similar water-miscible organic solvent. The precipitate can then be recovered, purified if desired, and dried. In many cases it will be preferred to omit separation of the myceium and recover a crude product containing the polysaccharide, mycelium and impurities by simply dehydrating the liquor. These and other procedures for production of the material have been described in greater detail in the literature and will therefore be familiar to those skilled in the art.

Studies have shown that polysaccharides with the structure depicted in FIG. 1 can be readily dispersed in fresh water or brine to give highly viscous, psuedoplastic, gel-forming fluids whose gel structure is reversibly destroyed by mechanical shearing but regenerates on standing. Such polysaccharides normally have molecular weights between about 19,000 and about 25,000 and hence the value of $n$ in the formula shown is generally between about 30 and about 38. The material has excellent thermal stability in both fresh water and salt solutions and possesses rheological properties which make it attractive for use in oilfield drilling muds and similar fluids.

The acids that are reacted with the water-dispersible organic polymers to produce the modified polymers of the invention are aliphatic $\alpha$-keto carboxylic acids containing from 2 up to about 6 carbon atoms per molecule. The longer chain acids tend to reduce the solubility of the water-dispersible polymers and hence the use of acids containing from 2 to 3 carbon atoms per molecule is preferred. Suitable acids include glyoxalic acid, pyruvic acid, 2-oxobutanoic acid, 2-oxopentanoic acid, 2,4-dioxopentanoic acid, 2-oxohexanoic acid and the like. Pyruvic acid has been found particularly effective and is normally preferred.

The reaction between the water-dispersible polymers and $\alpha$-keto carboxylic acids is carried out in an aqueous medium at temperatures in the range between about 70° F. and about 250° F. This reaction differs from most other ketalation reactions in that it does not require acidic, anhydrous conditions. Acid catalysts may be added to promote the reaction but are generally not essential. The keto acids themselves are normally sufficiently acidic to react satisfactorily without a catalyst. In carrying out the reaction, the polymer is generally employed in a concentration in the aqueous medium between about 0.05 percent and about 5 percent by weight. Higher polymer concentrations are feasible but are difficult to use because of the high viscosities of the resultant solutions. By slurrying the polymer in an organic liquid in which it is insoluble, such as benzene or toluene, concentrations in excess of 5 percent can be used. The concentration of the $\alpha$-keto acid in the reaction mixture will generally range from about 1 to about 25 mole percent, based on the number of active sites on the polymer molecule. Concentrations of from about 5 to about 15 mole percent are preferred.

The time required for completion of the reaction between the polymer and $\alpha$-keto acid will depend upon the temperature employd, the structure of the particular polymer used, and the acid selected. At high temperatures, the reaction generally takes place quite rapidly and may be complete in a matter of minutes. At room temperature, on the other hand, several hours may be required. It is generally preferred to carry out the reaction by first dispersing the polymer in water in a concentration of from about 0.05 to about 1 percent by weight, adding pyruvic acid to the solution in a concentration from about 0.005 to about 0.05 percent by weight, heating the solution at a temperature between about 100 and 250° F. for a period of from about 1 minute to about 2 hours, and thereafter cooling the solution to room temperature. The cooled solution can thereafter be neutralized to a pH of about 7 or 8 and stripped of solvent by drying, alcohol precipitation, or other conventional techniques. An alternate procedure is to carry out the reaction by adding the $\alpha$-keto acid to a dispersion of the polymer during the synthesis or purification process. This simplifies handling of the material and is generally preferred.

Figure 2:
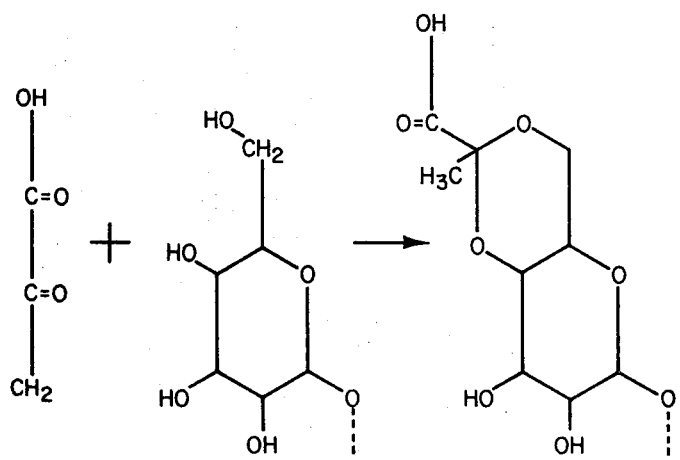
FIG. 2 depicts the reaction of an $\alpha$-keto carboxylic acid with hydroxyl groups located in $\beta$ positions with respect to one another on a pendant ring of the polymer of FIG. 1.

The reaction product obtained is a modified polymer containing acid groups as shown in FIG. 2 of the drawing. The keto group on the $\alpha$-keto carboxylic acid molecule condenses with the hydroxyl group in $\beta$-positions with respect to one another to form a six-membered cyclic structure containing two oxygen atoms and water. The carboxyl group from the keto acid is attached to the carbon atom between the two oxygens along with the methyl or other aliphatic portion of the $\alpha$-keto acid. It will be apparent from FIG. 1 of the drawing that the ketalation reaction thus described can theoretically take place at either point A on the pendant rings of the polymer molecule at points B along the polymer chain or backbone. Steric considerations suggest that the reaction should preferentially occur on the pendant rings but there are indications that both sites may be involved.

The modified polymers prepared as described above can be crosslinked with trivalent chromium ions or similar polyvalent cations selected from Groups III through VIII of the Periodic Table. The crosslinking agents employed are preferably water-soluble trivalent chromium compounds such as chromium bromide, chromium chloride, chromium nitrate, basic chromium sulfate, chromium ammonium sulfate, chromium potassium sulfate, and the like. The crosslinking reaction may, however, be carried out with other water-soluble compounds which yield polyvalent metal cations in aqueous solution such as manganese dichloride, magnesium aluminum silicate and the like, if desired, The latter materials are somewhat less effective than the water-soluble chromium compounds referred to above but may nevertheless be employed under certain circumstances.

The crosslinking reaction may be carried out by adding a water-soluble salt or other suitable compound yielding trivalent chromium or similar polyvalent metal cations capable of taking part in the reaction to a solution containing the modified polysaccharide. The concentrations in which the modified polysaccharides are used generally range between about 0.001 percent and about 5 percent by weight, preferably between about 0.05 percent and about 3 percent by weight. Polysaccharide concentrations in excess of about 5 percent by weight are normally extremely viscous and very difficult to handle at low shear rates but may be employed in certain instances. The salts or other compounds yielding the polyvalent cations in aqueous solution are normally used in concentrations between about 0.001 percent and about 1 percent by weight, preferably between about 0.05 percent and about 0.5 percent, based on the modified heteropolysaccharide solution. Higher concentrations of the crosslinking agents generally have no pronounced adverse effect on the reaction, as long as the pH and other conditions are properly controlled, and may be utilized if desired.

The modified polysaccharides are normally crosslinked at ambient temperature and under controlled pH conditions. The reaction proceeds readily in either fresh water or brine and is normally accompanied by a pronounced increase in viscosity and the formation of a gel. The extent to which the viscosity increases is determined in part by the amount of crosslinking agent employed, the pH of the solution, the order and time interval over which the constituents are added to the solution, and the method employed to mix the constituents in solution. In general it is preferred to stir the modified polysaccharide into water with sufficient agitation to form a homogeneous solution and to allow this solution to stand for a period of about two hours or more to assure complete hydration of the polymer. The cross-linking agent is then added and the solution is allowed to stand under acidic conditions for a few minutes to an hour or longer. Sodium hydroxide or a similar base can then be added to raise the pH to a value above about 6.8, preferably between about 7.5 and about 11, and promote the crosslinking reaction. After the base has been added, the solution is agitated to obtain uniform mixing of the constituents.

Figure 3:
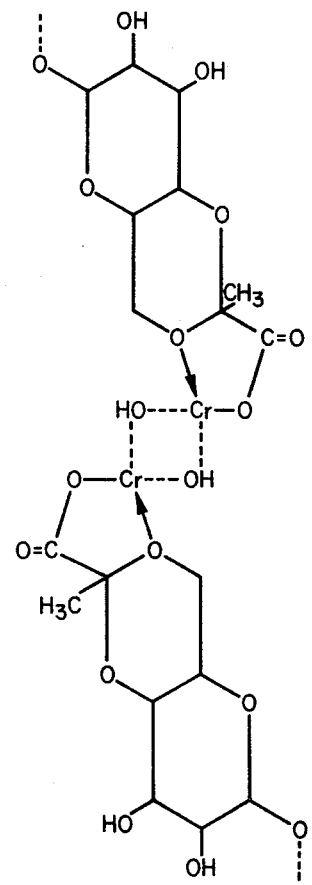
FIG. 3 represents the crosslinking between pendant rings on the modified polymer of FIG. 2 in the presence of trivalent chromium ions. The long chain portions of the polymer molecule are not shown in FIGS. 2 and 3.

Although the mechanisms responsible for the crosslinking are not fully understood, the chromium or similar ions apparently first react with the carboxyl groups on the modified polymer to form chromium chelates or analogous structures. Once the chelates are produced, they apparently lose protons from the water molecules of hydration and then dimerize to form the olated complex. The resulting structure is illustrated in FIG. 3 of the drawing. Only the pendant rings of the polymer molecules are shown. It will be noted that the trivalent chromium ions have reacted with the functional groups on the modified polymer molecule and then have condensed through a hydroxyl bonding process. This mechanism is confirmed by the behavior of the crosslinked polymer systems under shear and by the sensitivity of the systems to pH conditions. If the crosslinking involved the complexing of one chromium or similar ion with two polymer molecules, mechanical shear would cause permanent degradation of the product. Tests have shown, however, that the effect of shear is only temporary and that permanent degradation does not normally occur. This indicates that the shear stresses rupture weak bonds of an ionic character and that these readily reform. It has also been found that crosslinking of the polymer does not readily take place if the chromium or other ions are added under neutral or basic conditions. The chromium salts or similar compounds tend to olate spontaneously under such conditions and do not form complexes with chelating materials once eleation has occurred. Crosslinking therefore is preferably carried out by letting the polymer solution containing the chromium or similar ions stand under acidic conditions for a sufficient period to permit chelation to occur and then gradually adding base to raise the pH to about 9 or 10. Base added in this manner reacts preferentially with hydronium ions liberated during the chelation step and thus promotes formation of the dimer present in the crosslinked structure.

As indicated above, the crosslinked polymers are shear sensitive. Solutions of the crosslinked materials lose viscosity under high shear conditions but regain it as the shear is reduced. This makes such solutions particularly useful in oilfield drilling operations where high shear conditions exist in the immediate vicinity of the bit. The crosslinked polymer fluids lose viscosity as they pass beneath the bit and then regain their viscosity in the borehole annulus. The reduced viscosity facilitates penetration of the bit; while the increased viscosity in the annulus promotes the entrainment and suspension of cuttings and weighting agents. Only about half the polymer which would be required in the absence of crosslinking is necessary for the adequate suspension of cuttings and weighting agents.

Solutions containing the crosslinked polysaccharides prepared in the manner described above can be employed as drilling muds and similar fluids without the addition of other materials. It is generally preferred, however, to include a preservative such as formaldehyde, paraformaldehyde, or a mercury or arsenic compound. The preservatives are usually employed in concentrations between about 0.001 percent and about 1 percent, based on the weight of fluids in the system, but the optimum concentration will depend upon the particular agent selected and the conditions under which it is used. In addition to the preservatives, the fluids may contain weighting agents such as barium sulfate, barium carbonate, amorphous silica or calcium carbonate; gel forming materials such as bentonite and Attapulgus clay; fluid loss agents such as starch and carboxymethylcellulose; viscosity modifying agents such as sodium lignosulfonate, quebracho, and calcium lignosulfonate; calcium treating agents such as lime, calcium sulfate and calcium chloride; emulsifiers such as petroleum sulfonate, tall oil and sodium lignosulfonate; and mixing oils such as crude oil and diesel fuel. Not all of these materials will normally be present in a single fluid and the amount of any particular material used will be governed in part by the other constituents present and the service for which the fluid is intended. In selecting such materials for a particular fluid, care should be taken to avoid those materials that may have an adverse effect upon the crosslinked polysaccharide under the operating conditions which may be encountered.

The crosslinked polysaccharide solutions may be employed in oilfield drilling, completion and workout operations in much the same way that other fluids containing viscosity builders or thickeners are used. Generally speaking, no special equipment or operating procedures substantially different from those normally used are necessary.

The nature and objects of the invention are further illustrated by the following examples.

EXAMPLE I

In a first series of tests, an aqueous dispersion containing 2.0 pounds per barrel of a crude polysaccharide having the structure shown in FIG. 1 of the drawing was prepared. This polysaccharide is a polyglucan produced by Sclerotium Glucanicum and is composed of a $\beta$-1,3-glucan backbone with pendant glucose rings attached to every third glucose unit in the backbone structure. Hydroxyl and hydroxymethyl groups are attached to adjacent carbon atoms in both the pendant rings and the main chain of the polymer. The material used contained about 50 percent of the polysaccharide by weight, the remainder being impurities from the fermentation process. The crude polymer was added slowly while stirring the liquid with a mixer over a period of about 30 to 60 minutes. Care was taken to avoid introducing air into the fluid. After the polymer was thoroughly dispersed, the fluid was allowed to stand overnight to insure hydration. A 37 percent formaldehyde solution was added in a concentration of one-half pound per barrel as a bactericide.

Samples of the polymer dispersion prepared as described above were treated with pyruvic acid in various concentrations. The acid was added as a 10 percent aqueous solution. Each sample was heated in a water bath at 100° C. for 60 minutes to permit reaction of the acid with the polymer and was then cooled to room temperature. Following the reaction, each sample was diluted with an equal volume of distilled water. Chromium chloride ($CrCl_3:6H_2O$) was added to the samples in a concentration of 0.20 pound per barrel. This was stirred in for a period of 10 minutes and then neutralized by the dropwise addition of one normal sodium hydroxide until a pH of 9 was obtained. Each treated sample was allowed to stand overnight. The apparent viscosity, plastic viscosity, initial gel strength, and 10 minute gel strength of the samples were then measured with a Fann Model 35 Rheometer at ambient temperature. The results of these tests are set forth in Table I below.

TABLE I.—MODIFICATION OF CRUDE POLYGLUCAN WITH PYRUVIC ACID

| Sample No. | Molar ratio of— | | Apparent viscosity, cps. | Plastic viscosity, cps. | Gel strength | |
|---|---|---|---|---|---|---|
| | Pyruvic acid to glucose | Chromic chloride to glucose | | | Initial | 10-minute |
| 1 | 0:32 | 0:32 | 5.0 | 3.5 | 1.0 | 5.5 |
| 2 | 0:32 | 4:32 | 5.3 | 3.5 | 1.5 | 3.5 |
| 3 | 1:32 | 4:32 | 7.8 | 5.5 | 1.0 | 6.0 |
| 4 | 2:32 | 4:32 | 16.5 | 12.0 | 2.0 | 4.0 |
| 5 | 3:32 | 4:32 | 14.5 | 9.0 | 1.5 | 4.0 |
| 6 | 4:32 | 4:33 | 11.8 | 8.0 | 2.0 | 6.5 |
| 7 | 5:32 | 4:32 | 18.5 | 13.0 | 2.0 | 4.0 |
| 8 | 6:32 | 4:32 | 11.3 | 6.0 | 2.0 | 6.0 |
| 9 | 7:32 | 4:32 | 14.3 | 9.0 | 2.0 | 7.0 |
| 10 | 8:32 | 4:32 | 11.8 | 7.5 | 2.0 | 8.0 |

It will be noted from Table I above the reaction of the polyglucan with pyruvic acid and subsequent treatment of the modified polymer with chromic chloride produced significant improvements in the rheological properties of the polyglucan solution. The crosslinking of the modified polymer resulted in substantial increases in both the apparent viscosity and the plastic viscosity of the solution. The improvements in the gel strength values were less pronounced because of the low concentration in which the polymer was used but were nevertheless significant. These improvements permit use of the polymer in lower concentrations than would otherwise be required.

EXAMPLE II

Further tests similar to those described above were carried out with a purified polyglucan having the structure shown in FIG. 1 of the drawing. The polymer was first added to distilled water in a concentration of one pound per barrel, along with a 37 percent formaldehyde solution as a bactericide. After the polyglucan had hydrated, varying amounts of pyruvic acid were added to samples of the solution. Each sample was stirred for ten minutes, heated to 100° C. for 60 minutes, and then cooled to room temperatures. Chromic chloride in the form of a 10 percent solution was then added to certain of the samples. These were stirred for ten minutes and then raised to a pH of 9.0 by the dropwise addition of 1 N sodium hydroxide. The apparent viscosities and 10-minute gel strength values obtained after allowing the samples to stand overnight are shown in Table II.

TABLE II.—MODIFICATION OF PURIFIED POLYGLUCAN WITH PYRUVIC ACID

| Sample No. | Concentration, lbs./Bbl. of— | | Apparent viscosity, cps. | 10-minute gel strength, lbs./100 ft.² |
|---|---|---|---|---|
| | Pyruvic acid | Chromic chloride | | |
| 1 | 0.000 | 0.00 | 7.3 | 7.0 |
| 2 | 0.017 | 0.00 | 7.0 | 5.0 |
| 3 | 0.017 | 0.20 | 9.3 | 6.0 |
| 4 | 0.034 | 0.00 | 7.0 | 5.0 |
| 5 | 0.034 | 0.20 | 12.0 | 12.0 |
| 6 | 0.068 | 0.00 | 7.3 | 5.0 |
| 7 | 0.068 | 0.20 | 10.8 | 12.0 |
| 8 | 0.136 | 0.00 | 6.8 | 5.0 |
| 9 | 0.136 | 0.20 | 8.0 | 9.0 |

The data in Table II show that the rheological properties of the polyglucan solutions are not changed significantly by reacting pyruvic acid with the polymer but that substantial changes take place on crosslinking the polyglucan-pyruvic acid reaction product with chromic chloride in aqueous solution. The effect of the pyruvic acid is apparently limited to the creation of sites at which the crosslinking reaction can occur. Results similar to those set forth in Table II have been obtained with polyglucan solutions prepared with brine in place of distilled water.

EXAMPLE III

Still further tests were carried out using a commercial guar gum in place of the polyglucan employed earlier. Guar gum is similar to the polyglucan in that both are characterized by pendant rings having hydroxyl and hydroxymethyl groups attached to adjacent carbon atoms but the molecular weight and other structural features of the guar gum are different from those of the polyglucan. The procedures employed in reacting the guar gum with pyruvic acid in distilled water and in crosslinking the modified polymer with chromic chloride were essentially the same as those described in Example II. The results of measurements of the apparent viscosity and 10-minute gel strength are set forth in Table III.

TABLE III.—MODIFICATION OF GUAR GUM WITH PYRUVIC ACID

| Concentration, lbs./bbl. of— | | | Apparent viscosity, cps. | 10-minute gel strength, lbs./100 ft.² |
|---|---|---|---|---|
| Guar gum | Pyruvic acid | Chromic chloride | | |
| 1.00 | 0.000 | 0.00 | 6.5 | 0.0 |
| 1.00 | 0.034 | 0.00 | 6.8 | 0.0 |
| 1.00 | 0.034 | 0.05 | 8.5 | 1.5 |
| 1.00 | 0.034 | 0.10 | 13.0 | 3.5 |

The above table shows that the reaction of pyruvic acid with the guar gum in distilled water and crosslinking of the reaction product with chromic chloride produced an improvement in apparent viscosity and gel strength similar to that obtained with the polyglucan. It is thus apparent that other water-dispersible polymers having hydroxyl groups and hydroxymethyl attached to adjacent carbon atoms on pendant rings can be treated with α-keto acids and crosslinked with chromic chloride or similar polyvalent cations to obtain benefits similar to those obtained with the polyglucan.

What is claimed is:

1. A process for increasing the viscosity of an aqueous medium which comprises dispersing in said medium from about 0.001 to about 5 percent by weight of a modified polymer produced by reacting a long chain water-dispersible polysaccharide polymer containing hydroxyl groups and hydroxymethyl groups attached to carbon atoms adjacent to one another on the polysaccharide molecule with an aliphatic α-keto carboxylic acid containing from 2 to about 6 carbon atoms per molecule; adding from about 0.001 to about 1 percent by weight, based on the aqueous medium, of a water-soluble compound selected from the group consisting of water-soluble trivalent chromium compounds, manganese dichloride, and magnesium aluminum silicate to said medium; and thereafter raising the pH of said medium to a value above about 6.8.

2. A process as defined by claim 1 wherein said modified polymer is a modified polyglucan produced by reacting said acid with hydroxyl groups and hydroxymethyl groups attached to adjacent carbon atoms on pendant rings of said polyglucan.

3. A process as defined by claim 1 wherein said modified polymer is a modified guar gum.

4. A process as defined by claim 1 wherein said water-soluble compound is magnesium aluminum silicate.

5. A process as defined by claim 1 wherein said water-soluble compound is a trivalent chromium salt.

6. A process as defined by claim 5 wherein said chromium salt is chromic chloride.

7. A viscous liquid produced by the process of claim 1.

References Cited

UNITED STATES PATENTS 3,555,006 1/1971 Storfer _____ 252—8.55 X
3,228,855 1/1966 Cadmus et al. ____ 252—316 X
3,058,909 10/1962 Kern _____ 252—8.55 X
3,243,000 3/1966 Patton et al. _____ 252—8.5 X
3,436,346 4/1969 Westover et al. ____ 252—8.55

HERBERT B. GUYNN, Primary Examiner

U.S. Cl. X.R.

252—8.55 R, 316